(12) United States Patent
    Xie et al.

(10) Patent No.: US 12,694,607 B2
(45) Date of Patent: Jul. 28, 2026

(54) GENERATING MULTI-ANGLE VIDEO FROM IMAGES

(71) Applicant: Stability AI Ltd, London (GB)

(72) Inventors: Yiming Xie, Boston, MA (US);
    Chun-Han Yao, Sunnyvale, CA (US);
    Vikram Voleti, Kitchener (CA); Varun Jampani, Rockland, MA (US)

(73) Assignee: Stability AI Ltd, London (GB)

( * ) Notice: Subject to any disclaimer, the term of this patent is extended or adjusted under 35 U.S.C. 154(b) by 0 days.

(21) Appl. No.: 19/340,968

(22) Filed: Sep. 26, 2025

(65) Prior Publication Data

US 2026/0087729 A1     Mar. 26, 2026

Related U.S. Application Data

(60) Provisional application No. 63/699,554, filed on Sep. 26, 2024.

(51) Int. Cl.
    G06T 15/10         (2011.01)
(52) U.S. Cl.
    CPC .......... G06T 15/10 (2013.01); G06T 2200/24 (2013.01)
(58) Field of Classification Search
    CPC .............................. G06T 15/10; G06T 2200/24
    See application file for complete search history.

(56)         References Cited

U.S. PATENT DOCUMENTS

2025/0182404 A1* 6/2025 Kreis ...................... G06T 17/00
2025/0356506 A1* 11/2025 Kansy .................... G06T 13/80

OTHER PUBLICATIONS

Liang et al. "Diffusion4D: Fast Spatial-temporal Consistent 4D Generation via Video Diffusion Models", arXiv:2405.16645v1, submitted on May 26, 2024 (Year: 2024).*
Chen et al. "V3D: Video Diffusion Models are Effective 3D Generators", arXiv:2403.06738v1, submitted on Mar. 11, 2024 (Year: 2024).*
Sherwin Bahmani, Ivan Skorokhodov, Victor Rong, Gordon Wetzstein, Leonidas Guibas, Peter Wonka, Sergey Tulyakov, Jeong Joon Park, Andrea Tagliasacchi, and David B. Lindell. 4D-fy: Text-to-4D generation using hybrid score distillation sampling. In *Proceedings of the IEEE/CVF Conference on Computer Vision and Pattern Recognition*, 2024.

(Continued)

*Primary Examiner* — Kee M Tung
*Assistant Examiner* — Xiaoming Wei
(74) *Attorney, Agent, or Firm* — Kilpatrick Townsend & Stockton LLP

(57)         ABSTRACT

Techniques include receiving a first image frame showing an object from a first view and a second image frame showing the object from the first view, wherein the first image frame and second image frame are different image frames. The techniques further include generating, based at least in part on the first image frame, a third image frame of the object from a second view that is different than the first view. The techniques further include generating, based at least in part on the second image frame and the third image frame, a fourth image frame of the object from the second view. The techniques further include generating a video of the object from the second view by combining at least the third image frame and fourth image frame.

20 Claims, 8 Drawing Sheets

(56) References Cited

OTHER PUBLICATIONS

Andreas Blattmann, Tim Dockhorn, Sumith Kulal, Daniel Mendelevitch, Maciej Kilian, Do- minik Lorenz, Yam Levi, Zion English, Vikram Voleti, Adam Letts, et al. Stable video diffusion: Scaling latent video diffusion models to large datasets. arXiv preprint arXiv:2311.15127, 2023.

Andreas Blattmann, Robin Rombach, Huan Ling, Tim Dockhorn, Seung Wook Kim, Sanja Fidler, and Karsten Kreis. Align your latents: High-resolution video synthesis with latent diffusion models. In *Proceedings of the IEEE/CVF Conference on Computer Vision and Pattern Recognition*, 2023.

Sergi Caelles, Jordi Pont-Tuset, Federico Perazzi, Alberto Montes, Kevis-Kokitsi Maninis, and Luc Van Gool. The 2019 davis challenge on video object segmentation. arXiv, 2019.

Ang Cao and Justin Johnson. Hexplane: A fast representation for dynamic scenes. In *Proceed- ings of the IEEE/CVF Conference on Computer Vision and Pattern Recognition*, 2023.

Zilong Chen, Feng Wang, and Huaping Liu. Text-to-3D using gaussian splatting. ar Xiv preprint arXiv:2309.16585, 2023.

Zilong Chen, Yikai Wang, Feng Wang, Zhengyi Wang, and Huaping Liu. V3D: Video diffusion models are effective 3D generators. arXiv preprint arXiv:2403.06738, 2024.

Matt Deitke, Ruoshi Liu, Matthew Wallingford, Huong Ngo, Oscar Michel, Aditya Kusupati, Alan Fan, Christian Laforte, Vikram Voleti, Samir Yitzhak Gadre, Eli VanderBilt, Aniruddha Kembhavi, Carl Vondrick, Georgia Gkioxari, Kiana Ehsani, Ludwig Schmidt, and Ali Farhadi. Objaverse-xl: A universe of 10m+ 3d objects. arXiv preprint arXiv:2307.05663, 2023.

Matt Deitke, Dustin Schwenk, Jordi Salvador, Luca Weihs, Oscar Michel, Eli VanderBilt, Ludwig Schmidt, Kiana Ehsani, Aniruddha Kembhavi, and Ali Farhadi. Objaverse: A universe of annotated 3D objects. In *Proceedings of the IEEE/CVF Conference on Computer Vision and Pattern Recognition*, 2023.

Quankai Gao, Qiangeng Xu, Zhe Cao, Ben Mildenhall, Wenchao Ma, Le Chen, Danhang Tang, and Ulrich Neumann. GaussianFlow: Splatting gaussian dynamics for 4D content creation. arXiv preprint arXiv:2403.12365, 2024.

Pengsheng Guo, Hans Hao, Adam Caccavale, Zhongzheng Ren, Edward Zhang, Qi Shan, Aditya Sankar, Alexander G Schwing, Alex Colburn, and Fangchang Ma. StableDreamer: Taming noisy score distillation sampling for text-to-3d. arXiv preprint arXiv:2312.02189, 2023.

Yuwei Guo, Ceyuan Yang, Anyi Rao, Yaohui Wang, Yu Qiao, Dahua Lin, and Bo Dai. Ani- mateDiff: Animate your personalized text-to-image diffusion models without specific tuning. arXiv preprint arXiv:2307.04725, 2023.

Junlin Han, Filippos Kokkinos, and Philip Torr. VFusion3D: Learn- ing scalable 3D generative models from video diffusion models. arXiv preprint arXiv:2403.12034, 2024.

Yingqing He, Tianyu Yang, Yong Zhang, Ying Shan, and Qifeng Chen. Latent video diffusion models for high-fidelity long video generation. arXiv, 2022.

Jonathan Ho, Tim Salimans, Alexey Gritsenko, William Chan, Mohammad Norouzi, and David J Fleet. Video diffusion models. *Advances in Neural Information Processing Systems*, 2022.

Yicong Hong, Kai Zhang, Jiuxiang Gu, Sai Bi, Yang Zhou, Difan Liu, Feng Liu, Kalyan Sunkavalli, Trung Bui, and Hao Tan. LRM: Large reconstruction model for single image to 3d. arXiv preprint arXiv:2311.04400, 2023.

Hanwen Jiang, Zhenyu Jiang, Yue Zhao, and Qixing Huang. LEAP: Liberate sparse-view 3D modeling from camera poses. ArXiv, 2310.01410, 2023.

Yanqin Jiang, Li Zhang, Jin Gao, Weimin Hu, and Yao Yao. Consistent4D: Consistent 360 {\deg} dynamic object generation from monocular video. arXiv preprint arXiv:2311.02848, 2023.

Animesh Karnewar, Niloy J Mitra, Andrea Vedaldi, and David Novotny. HoloFusion: To- wards photo-realistic 3D generative modeling. In *Proceedings of the IEEE/CVF International Confer- ence on Computer Vision*, 2023.

Bernhard Kerbl, Georgios Kopanas, Thomas Leimkühler, and George Drettakis. 3D gaussian splatting for real-time radiance field render- ing. *ACM Transactions on Graphics*, 2023.

Diederik P Kingma and Jimmy Ba. Adam: A method for stochastic optimization. arXiv preprint arXiv:1412.6980, 2014.

Jeong-gi Kwak, Erqun Dong, Yuhe Jin, Hanseok Ko, Shweta Mahajan, and Kwang Moo Yi. Vivid-1-to-3: Novel view synthesis with video diffusion models. In *Proceedings of the IEEE/CVF Conference on Computer Vision and Pattern Recognition*, 2024.

Jiahao Li, Hao Tan, Kai Zhang, Zexiang Xu, Fujun Luan, Yinghao Xu, Yicong Hong, Kalyan Sunkavalli, Greg Shakhnarovich, and Sai Bi. Instant3d: Fast text-to-3d with sparse-view generation and large reconstruction model. arXiv preprint arXiv:2311.06214, 2023.

Weiyu Li, Rui Chen, Xuelin Chen, and Ping Tan. SweetDreamer: Aligning geometric priors in 2D diffusion for consistent text-to-3D. arXiv preprint arXiv:2310.02596, 2023.

Zhen Li, Zuo-Liang Zhu, Ling-Hao Han, Qibin Hou, Chun-Le Guo, and Ming-Ming Cheng. Amt: All-pairs multi-field transforms for efficient frame interpolation. In *IEEE Conference on Computer Vision and Pattern Recognition*, 2023.

Yixun Liang, Xin Yang, Jiantao Lin, Haodong Li, Xiaogang Xu, and Yingcong Chen. Lu-cidDreamer: Towards high-fidelity text-to-3D generation via interval score matching. arXiv, 2023.

Huan Ling, Seung Wook Kim, Antonio Torralba, Sanja Fidler, and Karsten Kreis. Align your gaussians: Text-to-4D with dynamic 3D gaussians and composed diffusion models. arXiv preprint arXiv:2312.13763, 2023.

Minghua Liu, Ruoxi Shi, Linghao Chen, Zhuoyang Zhang, Chao Xu, Xinyue Wei, Hansheng Chen, Chong Zeng, Jiayuan Gu, and Hao Su. One-Feb. 3, 45++: Fast single image to 3D objects with consistent multi-view generation and 3D diffusion. arXiv preprint arXiv:2311.07885, 2023.

Minghua Liu, Chao Xu, Haian Jin, Linghao Chen, Mukund Varma T, Zexiang Xu, and Hao Su. One-2-3-45: Any single image to 3D mesh in 45 seconds without per-shape optimization. In *Advances in Neural Information Processing Systems*, 2023.

Ruoshi Liu, Rundi Wu, Basile Van Hoorick, Pavel Tokmakov, Sergey Zakharov, and Carl Vondrick. Zero-1-to-3: Zero-shot one image to 3D object. In *Proceedings of the IEEE/CVF International Conference on Computer Vision*, 2023.

Yuan Liu, Cheng Lin, Zijiao Zeng, Xiaoxiao Long, Lingjie Liu, Taku Komura, and Wenping Wang. SyncDreamer: Generating multiview-consistent images from a single-view image. arXiv preprint arXiv:2309.03453, 2023.

Xiaoxiao Long, Yuan-Chen Guo, Cheng Lin, Yuan Liu, Zhiyang Dou, Lingjie Liu, Yuexin Ma, Song-Hai Zhang, Marc Habermann, Christian Theobalt, et al. Wonder3D: Single image to 3D using cross-domain diffusion. arXiv preprint arXiv:2310.15008, 2023.

Luke Melas-Kyriazi, Iro Laina, Christian Rupprecht, Natalia Neverova, Andrea Vedaldi, Oran Gafni, and Filippos Kokkinos. IM-3D: Itera- tive multiview diffusion and reconstruction for high- quality 3D generation. arXiv preprint arXiv:2402.08682, 2024.

Ben Mildenhall, Pratul P Srinivasan, Matthew Tancik, Jonathan T Barron, Ravi Ramamoor- thi, and Ren Ng. NeRF: Representing scenes as neural radiance fields for view synthesis. *Communications of the ACM*, 2021.

Thomas Müller, Alex Evans, Christoph Schied, and Alexander Keller. Instant neural graphics primitives with a multiresolution hash encoding. *ACM Trans. Graph.*, 2022.

Zijie Pan, Jiachen Lu, Xiatian Zhu, and Li Zhang. Enhancing high-resolution 3D generation through pixel-wise gradient clipping. arXiv preprint arXiv:2310.12474, 2023.

Zijie Pan, Zeyu Yang, Xiatian Zhu, and Li Zhang. Fast dynamic 3D object generation from a single-view video. arXiv preprint arXiv:2401.08742, 2024.

Federico Perazzi, Jordi Pont-Tuset, Brian McWilliams, Luc Van Gool, Markus Gross, and Alexander Sorkine-Hornung. A bench- mark dataset and evaluation methodology for video object segmen- tation. In *The IEEE Conference on Computer Vision and Pattern Recognition*, 2016.

Jordi Pont-Tuset, Federico Perazzi, Sergi Caelles, Pablo Arbeláez, Alexander Sorkine-Hornung, and Luc Van Gool. The 2017 davis challenge on video object segmentation. arXiv:1704.00675, 2017.

(56) References Cited

OTHER PUBLICATIONS

Ben Poole, Ajay Jain, Jonathan T Barron, and Ben Mildenhall. Dreamfusion: Text-to-3D using 2D diffusion. arXiv preprint arXiv:2209. 14988, 2022.

Albert Pumarola, Enric Corona, Gerard Pons-Moll, and Francesc Moreno-Noguer. D-NeRF: Neural radiance fields for dynamic scenes. In *Proceedings of the IEEE/CVF Conference on Computer Vision and Pattern Recognition*, 2021.

Jiawei Ren, Liang Pan, Jiaxiang Tang, Chi Zhang, Ang Cao, Gang Zeng, and Ziwei Liu. DreamGaussian4D: Generative 4D gaussian splatting. arXiv preprint arXiv:2312.17142, 2023.

Kyle Sargent, Zizhang Li, Tanmay Shah, Charles Herrmann, Hong-Xing Yu, Yunzhi Zhang, Eric Ryan Chan, Dmitry Lagun, Li Fei-Fei, Deqing Sun, et al. ZeroNVS: Zero-shot 360-degree view synthesis from a single real image. arXiv preprint arXiv:2310.17994, 2023.

Ruoxi Shi, Hansheng Chen, Zhuoyang Zhang, Minghua Liu, Chao Xu, Xinyue Wei, Linghao Chen, Chong Zeng, and Hao Su. Zero123++: a single image to consistent multi-view diffusion base model. arXiv preprint arXiv:2310.15110, 2023.

Yichun Shi, Peng Wang, Jianglong Ye, Mai Long, Kejie Li, and Xiao Yang. MVDream: Multi-view diffusion for 3D generation. arXiv preprint arXiv:2308.16512, 2023.

Yukai Shi, Jianan Wang, He Cao, Boshi Tang, Xianbiao Qi, Tianyu Yang, Yukun Huang, Shilong Liu, Lei Zhang, and Heung-Yeung Shum. Toss: High-quality text-guided novel view synthesis from a single image. arXiv preprint arXiv:2310.10644, 2023.

Uriel Singer, Adam Polyak, Thomas Hayes, Xi Yin, Jie An, Songyang Zhang, Qiyuan Hu, Harry Yang, Oron Ashual, Oran Gafni, et al. Make-a-video: Text-to-video generation without text-video data. arXiv preprint arXiv:2209.14792, 2022.

Uriel Singer, Shelly Sheynin, Adam Polyak, Oron Ashual, Iurii Makarov, Filippos Kokkinos, Naman Goyal, Andrea Vedaldi, Devi Parikh, Justin Johnson, and Yaniv Taigman. Text-to-4D dynamic scene generation. arXiv:2301.11280, 2023.

Jingxiang Sun, Bo Zhang, Ruizhi Shao, Lizhen Wang, Wen Liu, Zhenda Xie, and Yebin Liu. DreamCraft3D: Hierarchical 3D generation with bootstrapped diffusion prior. arXiv preprint arXiv:2310. 16818, 2023.

Jiaxiang Tang, Jiawei Ren, Hang Zhou, Ziwei Liu, and Gang Zeng. DreamGaussian: Generative gaussian splatting for efficient 3D content creation. arXiv preprint arXiv:2309.16653, 2023.

Dmitry Tochilkin, David Pankratz, Zexiang Liu, Zixuan Huang, Adam Letts, Yangguang Li, Ding Liang, Christian Laforte, Varun Jampani, and Yan-Pei Cao. TripoSR: Fast 3D object reconstruction from a single image. arXiv preprint arXiv:2403.02151, 2024.

Thomas Unterthiner, Sjoerd Van Steenkiste, Karol Kurach, Raphael Marinier, Marcin Michalski, and Sylvain Gelly. Towards accurate generative models of video: A new metric & challenges. arXiv preprint arXiv:1812.01717, 2018.

Vikram Voleti, Alexia Jolicoeur-Martineau, and Christopher Pal. MCVD: Masked conditional video diffusion for prediction, generation, and interpolation. In *Advances in Neural Information Processing Systems*, 2022.

Vikram Voleti, Chun-Han Yao, Mark Boss, Adam Letts, David Pankratz, Dmitrii Tochilkin, Christian Laforte, Robin Rombach, and Varun Jampani. SV3D: Novel multi-view synthesis and 3D generation from a single image using latent video diffusion. In *European Conference on Computer Vision*, 2024.

Peng Wang and Yichun Shi. ImageDream: Image-prompt multi-view diffusion for 3D generation. arXiv preprint arXiv:2312.02201, 2023.

Peng Wang, Hao Tan, Sai Bi, Yinghao Xu, Fujun Luan, Kalyan Sunkavalli, Wenping Wang, Zexiang Xu, and Kai Zhang. PF-LRM: Pose-free large reconstruction model for joint pose and shape prediction. arXiv preprint arXiv:2311.12024, 2023.

Zhengyi Wang, Cheng Lu, Yikai Wang, Fan Bao, Chongxuan Li, Hang Su, and Jun Zhu. Pro-lificDreamer: High-fidelity and diverse text-to-3D generation with variational score distillation. In *Advances in Neural Information Processing Systems*, 2024.

Xinyue Wei, Kai Zhang, Sai Bi, Hao Tan, Fujun Luan, Valentin Deschaintre, Kalyan Sunkavalli, Hao Su, and Zexiang Xu. MeshLRM: Large reconstruction model for high-quality mesh. arXiv preprint arXiv:2404.12385, 2024.

Haohan Weng, Tianyu Yang, Jianan Wang, Yu Li, Tong Zhang, CL Chen, and Lei Zhang. Consistent123: Improve consistency for one image to 3D object synthesis. arXiv preprint arXiv:2310.08092, 2023.

Guanjun Wu, Taoran Yi, Jiemin Fang, Lingxi Xie, Xiaopeng Zhang, Wei Wei, Wenyu Liu, Qi Tian, and Xinggang Wang. 4D gaussian splatting for real-time dynamic scene rendering. In *Proceedings of the IEEE/CVF Conference on Computer Vision and Pattern Recognition*, 2024.

Zeyu Yang, Zijie Pan, Chun Gu, and Li Zhang. Diffusion2: Dynamic 3D content generation via score composition of orthogonal diffusion models. arXiv preprint arXiv:2404.02148, 2024.

Jianglong Ye, Peng Wang, Kejie Li, Yichun Shi, and Heng Wang. Consistent-1-to-3: Con- sistent image to 3D view synthesis via geometry-aware diffusion models. arXiv preprint arXiv:2310. 03020, 2023.

Taoran Yi, Jiemin Fang, Guanjun Wu, Lingxi Xie, Xiaopeng Zhang, Wenyu Liu, Qi Tian, and Xinggang Wang. GaussianDreamer: Fast generation from text to 3D gaussian splatting with point cloud priors. arXiv preprint arXiv:2310.08529, 2023.

Zehao Yu, Songyou Peng, Michael Niemeyer, Torsten Sattler, and Andreas Geiger. MonoSDF: Exploring monocular geometric cues for neural implicit surface reconstruction. *Advances in neural information processing systems*, 2022.

Yifei Zeng, Yangin Jiang, Siyu Zhu, Yuanxun Lu, Youtian Lin, Hao Zhu, Weiming Hu, Xun Cao, and Yao Yao. STAG4D: Spatial-temporal anchored generative 4D gaussians. arXiv preprint arXiv:2403. 14939, 2024.

Richard Zhang, Phillip Isola, Alexei A Efros, Eli Shechtman, and Oliver Wang. The unrea-sonable effectiveness of deep features as a perceptual metric. In *Proceedings of the IEEE conference on computer vision and pattern recognition*, 2018.

Yuyang Zhao, Zhiwen Yan, Enze Xie, Langing Hong, Zhenguo Li, and Gim Hee Lee. An-imate 124: Animating one image to 4D dynamic scene. arXiv preprint arXiv:2311.14603, 2023.

Linqi Zhou, Andy Shih, Chenlin Meng, and Stefano Ermon. DreamPropeller: Supercharge text-to-3D generation with parallel sampling. arXiv preprint arXiv:2311.17082, 2023.

Zi-Xin Zou, Zhipeng Yu, Yuan-Chen Guo, Yangguang Li, Ding Liang, Yan-Pei Cao, and Song-Hai Zhang. Triplane meets gaussian splatting: Fast and generalizable single-view 3D reconstruction with transformers. arXiv preprint arXiv:2312.09147, 2023.

PCT/EP2025/077663, "International Search Report and Written Opinion", Nov. 4, 2025, 13 pages.

Xie et al. "SV4D: Dynamic 3D Content Generation with Multi-Frame and Multi-View Consistency". Arxiv.org. pp. 1-15. Jul. 24, 2024.

* cited by examiner

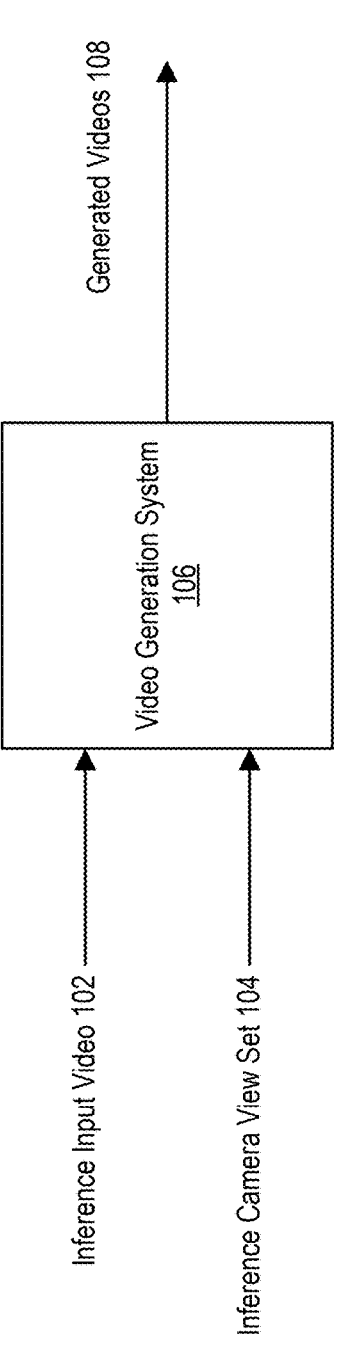
*FIG. 1*

Training Sample 200

Ground Truth
Output Images
208

| First Timestep Image of First Image Set 210a | Second Timestep Image of First Image Set 210b | Third Timestep Image of First Image Set 210c | Fourth Timestep Image of First Image Set 210d |
| First Timestep Image of Second Image Set 212a | Second Timestep Image of Second Image Set 212b | Third Timestep Image of Second Image Set 212c | Fourth Timestep Image of Second Image Set 212d |
| First Timestep Image of Third Image Set 214a | Second Timestep Image of Third Image Set 214b | Third Timestep Image of Third Image Set 214c | Fourth Timestep Image of Third Image Set 214d |
| First Timestep Image of Fourth Image Set 216a | Second Timestep Image of Fourth Image Set 216b | Third Timestep Image of Fourth Image Set 216c | Fourth Timestep Image of Fourth Image Set 216d |

Training Input View Images 206

Training Input Video 204

*FIG. 2*

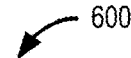

600

| 602 |
| Receive, by a diffusion model, a first embedding |

| 604 |
| Receive, by the diffusion model, a noised embedding |

| 606 |
| Receive, by the diffusion model, a fourth embedding |

| 608 |
| Receive, by the diffusion model, a fifth embedding |

| 610 |
| Generate and output, by the diffusion model, a generated embedding |

| 612 |
| transmit, by the diffusion model, the generated embedding |

| 614 |
| transmit, by the diffusion model, the generated embedding |

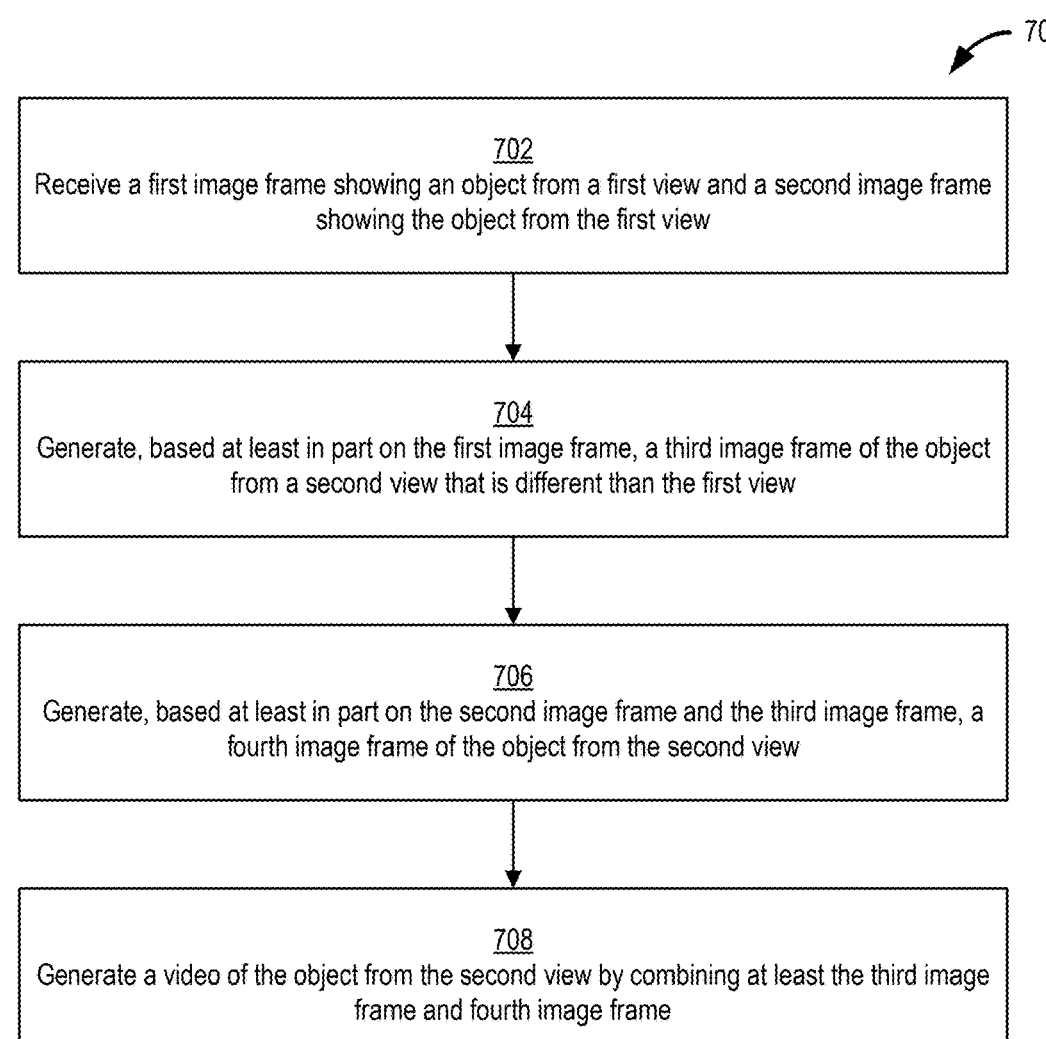

702
Receive a first image frame showing an object from a first view and a second image frame showing the object from the first view 704
Generate, based at least in part on the first image frame, a third image frame of the object from a second view that is different than the first view 706
Generate, based at least in part on the second image frame and the third image frame, a fourth image frame of the object from the second view 708
Generate a video of the object from the second view by combining at least the third image frame and fourth image frame

| DATA COLLECTION DEVICE 810 | PRINTER 808 | CENTRAL PROCESSOR 806 | SYSTEM MEMORY 804 | I/O CONTROLLER 802 |

| EXTERNAL INTERFACE 822 | STORAGE DEVICE(S) 820 | KEYBOARD 818 | I/O PORT 816 | DISPLAY ADAPTER 812 | MONITOR 814 |

GENERATING MULTI-ANGLE VIDEO FROM IMAGES

CROSS REFERENCE TO RELATED APPLICATIONS

This application claims the benefit of and priority to U.S. Provisional Application No. 63/699,554, filed Sep. 26, 2024, and titled "Generating Multi-Angle Video From Images," the content of which is herein incorporated by reference in its entirety for all purposes.

BACKGROUND

Artificial intelligence models (e.g., generative artificial intelligence models) have gained mainstream attention recently for their capabilities. Despite the impressive progress that has been made in the field of machine learning, existing techniques for training artificial intelligence models and use cases of artificial intelligence models could be further improved.

BRIEF DESCRIPTION OF THE DRAWINGS

Features, embodiments, and advantages of the present disclosure are better understood when the following Detailed Description is read with reference to the accompanying drawings.

FIG. 1 is a block diagram illustrating an example system, according to certain embodiments.

FIG. 2 is a block diagram illustrating an example training sample, according to certain embodiments.

FIG. 6 is a block diagram illustrating an example method of training a diffusion model, according to certain embodiments.

FIG. 7 is a block diagram illustrating an example method of using a diffusion model at inference time, according to certain embodiments.

DETAILED DESCRIPTION

Figure 3:
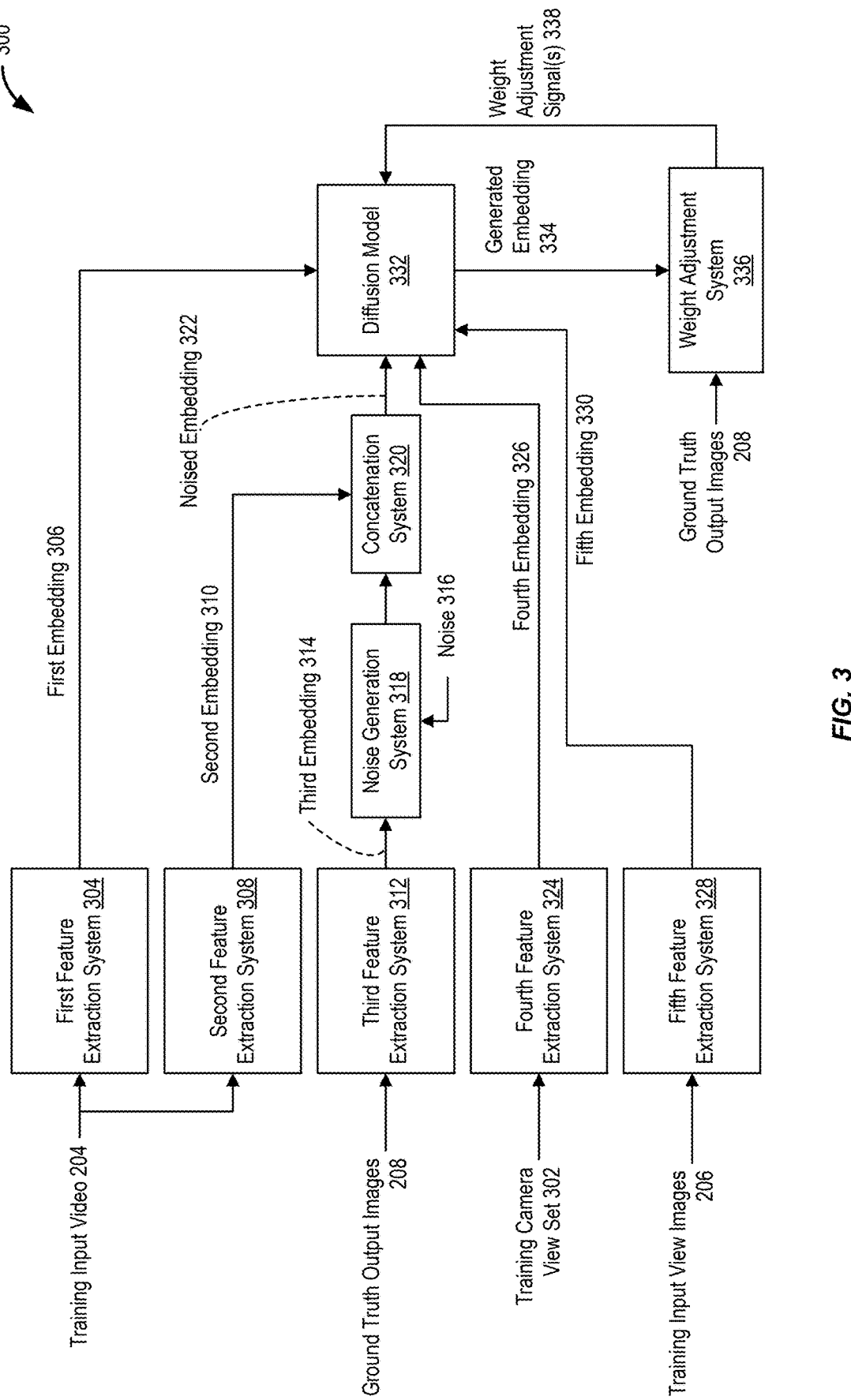
FIG. 3 is a block diagram illustrating an example training system, according to certain embodiments.

Techniques described herein involve generating novel view videos of dynamic (e.g., moving, changing orientation and/or position over time relative to a camera view) three-dimensional (3D) objects. Challenges exist with generating, using a machine learning model, videos of an object (e.g., a physical object, a virtual object, a house, a ball, a table, etc.) from one or more camera views that the object was not originally shown from by an original image or video. For example, one challenge is that datasets for training the machine learning model to generate the videos do not exist. As another example, the higher dimensional nature of the challenge may use a large number of parameters to represent a 3D shape, an appearance, and a motion of an object if conventional techniques are used which would use a large number of resources and/or limit system ability. Techniques describe herein involve training and performing inference with a latent video diffusion model for multiframe and multi-view consistent dynamic 3D content generation. Instead of relying on separately trained generative models for video generation and novel view synthesis, certain embodiments describe a unified diffusion model to generate novel view videos of dynamic 3D objects. Specifically, given a monocular reference video, a diffusion model can generate novel views for each video frame that are temporally consistent. The generated novel view videos may be used to optimize a four dimensional (4D) representation (a dynamic Neural Radiance Field (NeRF)) efficiently, without using cumbersome SDS-based optimization.

Techniques described herein can enable novel view video synthesis with multi-view dynamic consistency. Generated novel view videos can be consistent across both view and motion axis. Consistency across view can include a first frame at a first time step of a video showing an object being consistent with a second frame at the first time step of a second video showing the object. Two frames may be consistent if they show the object at the same position and orientation in a three dimensional space even when the two frames show the object from different camera views (e.g., camera positions and orientations). Consistency across views can include consistency among frames between videos from different views. Consistency across the motion axis can include frame-to-frame consistency within a video. The novel view videos can be used to optimize dynamic 3D objects (e.g., without SDS loss). The techniques described herein can use single input video (e.g., of a dynamic object), along with a set of indicated camera views (e.g., a camera trajectory around the object), and output one or more videos of the object along each of the indicated camera views. Accordingly, given a video with F number of frames and a camera trajectory with V number of camera views, a diffusion model can output a $V \times F$ grid of images.

Techniques described herein are advantageous for various reasons. A first advantage is that datasets for training a model for generating novel view videos of dynamic three-dimensional (3D) objects can be generated for use. One challenge with not having proper training data for the machine learning models described herein is that the models may learn patterns that are inaccurate, incomplete, and/or biased, which can lead to poor generalization when applied to real-world data. Without sufficient quality in the training data, the model may generate skewed output (e.g., that reflects imbalances in the dataset). Inadequate training data can also limit the robustness and reliability of the model, making it vulnerable to errors when faced with different inputs than those it was exposed to during training. Proper training data is therefore critical because it establishes the foundation for the model's ability to learn meaningful representations, generate accurate output, and perform consistently across a wide range of scenarios. High-quality, representative data ensures that the model can generalize to unseen cases, reduces the likelihood of unintended biases, and ultimately supports trustworthiness and effectiveness in practical applications.

Challenges also exist with visual object consistency across frames of a camera view, visual object consistency across frames of different camera views, and resource (e.g., memory consumption) when using models that use a high dimensional space. The inclusion and configuration of the view attention and/or frame attention blocks address the challenges, enabling certain embodiments to generate consistent images of object across views and/or frames and can do so with reduced memory constraints.

In certain embodiments, systems and/or machine learning models described herein can be implemented by a computer (e.g., server and/or client device, etc.). The computer(s) can be used to generate one or more videos based on a input image or video. By implementing the embodiments of the present disclosure, the systems and models can be improved. For example, training may be more effective and can be performed with less training iterations and thereby use less resources (e.g., memory, energy, processing, etc.). Improvements also exist for videos generated by the computer. The videos can be generated to be more accurate. The videos can be more accurate because object positioning and orientation presented by the videos can be consistent across video frames of a single generated video and can be consistent with frames at corresponding timesteps of other videos.

I. System Architectures

Systems described herein may include systems for training and using various models (e.g., a diffusion model). The various models may be used to provide a video generation system 106 that can generate output based on input.

FIG. 1 is a block diagram illustrating an example system 100, according to certain embodiments. The system 100 includes a video generation system 106. The video generation system 106 may include one or more machine learning models. A machine learning model may include a diffusion model. The video generation system 106 may receive an inference input video 102 and/or an inference camera view set 104 and use the input to output generated videos 108.

The inference input video 102 may include a view with a first number of image frames. The inference input video 102 may include a portion of a larger video. The inference input video 102 may include one or more image frames. The inference input video 102 may be received from a device (e.g., client device, server device) that stores one or more videos. The video may have been recorded using a camera. The inference input video 102 may have been generated by a machine learning model and/or an application configured to generate videos. For example, the inference input video 102 may have been generated by a software application that generates animated videos. The inference input video 102 may include a background. The background may include a single color, no color, and/or one or more objects. The inference input video 102 may represent a video of an object (e.g., a single object). The object may be moving (e.g., running, jumping, rotating, closing, opening, etc.) over the frames of the video.

The inference camera view set 104 may include a set of one or more views. A view may include a position in a three-dimensional space. The view may include a position in a two dimensional space. The view may include a position relative to a coordinate system and/or relative to an object presented by a frame of the inference input video 102. The inference camera view set 104 may be indicated by a prompt. The inference camera view set 104 and/or the indication of the inference camera view set 104 may be received from a user device and/or a user interface.

The video generation system 106 may receive the inference input video 102 and/or the inference camera view set 104 and generate generated videos 108 based on (e.g., based at least in part) the inference input video 102 and/or the inference camera view set 104. The view generation system may include one or more machine learning model (e.g., a diffusion model). The video generation system 106 may be running on a client device (e.g., a tablet, a laptop, a mobile phone, etc.) and/or a device remote from a client device (e.g., a server).

A. Training System Architecture

A video generation system 106 (e.g., video generation system 106) may include one or more machine learning models. The machine learning models may be trained by a model training system. The machine learning models may be trained using training samples so that the models can learn to generate output based on input received by the models.

FIG. 2 is a block diagram illustrating an example training sample 200, according to certain embodiments. Training sample 200 may be used to train a machine learning model. The training sample 200 may be included in a set of training data. The set of training data may be synthetically generated and/or included in a preexisting data set. The set of training data may include hundreds, thousands, hundreds of thousands, etc. training samples.

The training sample 200 may include a training input video 204, training input view images 206, and ground truth output images 208. The training sample 200 may be used during a process of training a machine learning model. The process may be an iterative process that uses many samples.

The training input video 204 may include a video that includes one or more image frames. In the illustrated example, the training input video 204 includes a first timestep image of a first image set 210a, a second time step image of the first image set 210b, a third timestep image of the first image set 210c, and a fourth timestep image of the first images set 210d. The first timestep image of the first image set 210a may include the image frame of a video (e.g., a video to be used by video generation system 106 to generate generated videos 108). Each of the images included in the first image set may represent an object (e.g., depict the object when presented by a user interface). Each of the images included in the first image set may include a background. The background may be presented by the images when the images are presented by the user interface. The background may include a single color or multiple colors. The object may be depicted at a position (e.g., relative to the camera position, relative to the virtual camera position, in a space that object is depicted in, etc.) and/or an orientation (pointing in a direction relative to a coordinate system in the space, pointing in a direction relative to the camera position).

The training input video 204 may include images captured from a first camera view. The camera view may be physical view (e.g., captured by a camera of a mobile device) or virtual view (e.g., an image captured by a virtual camera in a virtual space). The camera view may include a position in a coordinate space. The coordinate space may be two dimensional or three dimensional. The camera view may include an orientation in the coordinate space. The orientation may represent angle(s) of the camera placed at a specific position.

The training sample 204 may include one or more other image sets. For example, the illustrated example shows that the training sample 200 also includes a second image set, a third image set, and a fourth image set. The image sets may include images of the object captured from camera views that correspond to the image set. For example, as described above, the first image set may be captured from a first camera view. The second image set may be captured from a second camera view (e.g., different than the first camera view). The third image set may be captured from a third camera view (e.g., different from the first camera view and the second camera view). Other image sets may be captured from other camera views.

First timestep images may represent the object at the first timestep from the different camera views. For example, the first timestep image of the first image set 210a may represent the object being presented from a first camera view at a first timestep. The first timestep image of the second image set 212a may represent the object being presented from a second camera view at the first timestep. The first timestep image of the third image set 214a may represent the object being presented from a third camera view at the first timestep. The first timestep image of the fourth image set 216a may represent the object being presented from a fourth camera view at the first timestep.

Similarly, the second timestep image of the first image set 210b may represent the object being presented from a first camera view at a second timestep. The second timestep image of the second image set 212b may represent the object being presented from a second camera view at the second timestep. The second timestep image of the third image set 214b may represent the object being presented from a third camera view at the second timestep. The second timestep image of the fourth image set 216b may represent the object being presented from a fourth camera view at the second timestep.

Similarly, the third timestep image of the first image set 210c may represent the object being presented from a first camera view at a third timestep. The third timestep image of the second image set 212c may represent the object being presented from a second camera view at the third timestep. The third timestep image of the third image set 214c may represent the object being presented from a third camera view at the third timestep. The third timestep image of the fourth image set 216c may represent the object being presented from a fourth camera view at the third timestep.

Similarly, the fourth timestep image of the first image set 210d may represent the object being presented from a first camera view at a fourth timestep. The fourth timestep image of the second image set 212d may represent the object being presented from a second camera view at the fourth timestep. The fourth timestep image of the third image set 214d may represent the object being presented from a third camera view at the fourth timestep. The fourth timestep image of the fourth image set 216d may represent the object being presented from a fourth camera view at the fourth timestep.

Each of the image sets may represent a video that includes the respective first timestep images from a camera view. For example, the first image set may include images from the first camera view over time, the second image set may include images from the second camera view over time, the third image set may include images from the third camera view over time, and the fourth image set may include images from the fourth camera view over time.

The ground truth output images 208 may include the images from the training sample that are not included in the training input video 204 or the training input view images 206. The ground truth output images 208 may include images that can be compared with images generated by a diffusion model to evaluate performance of the diffusion model and cause one or more weights of the diffusion model to be adjusted. The ground truth output images 208 may include images that can have noise added to them so that they can be used to train the diffusion model to perform a diffusion process and generate an image without noise from a noisy image.

In certain embodiments, the training sample 200 includes images. In certain embodiments, the training sample 200 includes embeddings of the images. By precomputing embeddings of the images, less processing may be performed during training which can reduce energy, time, processing, and/or memory resources used during training.

FIG. 3 is a block diagram illustrating an example training system 300, according to certain embodiments. Training system 300 may include a first feature extraction system 304, a second feature extraction system 308, a third feature extraction system 312, a fourth feature extraction system 324, a fifth feature extraction system 328, a noise generation system 318, a concentration system, a diffusion model 332, and/or a weight adjustment system 336.

The first feature extraction system 304, the second feature extraction system 308, the third feature extraction system 312, the fourth feature extraction system 324, and/or the fifth feature extraction system 328 may include an encoder, a variational auto encoder (VAE) encoder and/or a Contrastive Language-Image Pretraining model (CLIP), etc. The second feature extraction system 308, the third feature extraction system 312, and the fifth feature extraction system 328 may include a same instance and/or configuration of an encoder. The encoder may be trained to encode an image into an image embedding. The encoder may have been used by a VAE system to train a decoder to generate an image based on an embedding. As mentioned above with respect to FIG. 2, in certain embodiments training data is run input to an encoder before training to generate embeddings of training samples to use during training. Accordingly, in certain embodiments, fewer feature extraction systems are used by a training system, than depicted in training system 300.

The first feature extraction system 304 may receive a training input video 204 (e.g., the training input video 204 described above with respect to training sample 200). The training input video 204 may be used by the first feature extraction system 304 to generate a first embedding 306 of the training input video 204. The first embedding 306 may include a first embedded representation of the images over the timesteps included in the training input video 204. As described above, in certain embodiments, the training input video 204 is represented by the first embedding 306 when the training sample includes embeddings of images and the first feature extraction system 304 may not be included in the training system 300. The first embedding 306 may be transmitted to the diffusion model 332 to be used for generating a generated embedding 334.

The second feature extraction system 308 may receive the training input video 204 (e.g., the training input video 204 described above with respect to training sample 200). The training input video 204 may be used by the second feature extraction system 308 to generate a second embedding 310 of the training input video 204. The second embedding 310 may include a second embedded representation of the images over the timesteps included in the training input video 204. As described above, in certain embodiments, the training input video 204 is represented by the second embedding 310 when the training sample includes embeddings of images and the second feature extraction system 308 may not be included in the training system 300. The second embedding 310 may be transmitted to the concatenation system 320.

The third feature extraction system 312 may receive the ground truth output images 208. The training input video 204 may be used by the third feature extraction system 312 to generate a third embedding 314, an embedding of the ground truth output images 208. The third embedding 314 may include an embedded representation of the ground truth output images 208. As described above, in certain embodiments, the ground truth output images 208 are represented by the third embedding 314 when the training sample includes embeddings of images and the third feature extraction system 312 may not be included in the training system 300. The third embedding 314 may be transmitted to the noise generation system 318.

The noise generation system 318 may add noise 316 to the third embedding 314. The noise generation system 318 may randomly add noise 316 to the third embedding 314. The noise 316 added to the third embedding 314 may be based on sampling from a distribution (e.g., a gaussian distribution). The noise generation system 318 may output a vector/embedding space summation of the third embedding 314 and the noise 316. The output from the noise generation system 318 may be transmitted to the concatenation system 320.

The concatenation system 320 may generate a noised embedding 322 based on the second embedding 310 and the output from the noise generation system 318. The concatenation system 320 may concatenate the second embedding 310 and the output from the noise generation system 318 to generate a noised embedding 322. The concentration of the two embeddings can improve capturing motion ques included in the training input video 204 compared to not performing any concatenation.

The fourth feature extraction system 324 may receive a training camera view set 302. The training camera view set 302 may represent a set of camera views. The training camera view set 302 may represent a set of camera views represented by the training input view images 206 and to be represented by the ground truth output images 208. The training camera view set 302 may be included in the training sample. The training camera view set 302 may be used by the fourth feature extraction system 324 to generate a fourth embedding 326, an embedding of the training camera view set 302. The fourth embedding 326 may include an embedded representation of the set of training camera views to be represented by a generated embedding 334 that is generated by the diffusion model 332. As described above, in certain embodiments, the training camera view set 302 is represented by the fourth embedding 326 when the training sample includes embeddings and the fourth feature extraction system 324 may not be included in the training system 300. The fourth embedding 326 may be transmitted to the concatenation system 320.

The fifth feature extraction system 328 may receive the training input view images 206. The training input view images 206 may be used by the fifth feature extraction system 328 to generate a fifth embedding 330, an embedding of the training input view images 206. The fifth embedding 330 may include an embedded representation of the training input view images 206. As described above, in certain embodiments, the training input view images 206 are represented by the fifth embedding 330 when the training sample includes embeddings of images and the fifth feature extraction system 328 may not be included in the training system 300. The fifth embedding 330 may be transmitted to the diffusion model 332.

The diffusion model 332 may receive the first embedding 306, the noised embedding 322, the fourth embedding 326, and/or the fifth embedding 330 and use the received input to generate and output a generated embedding 334. The generated embedding 334 may include the an embedding of the ground truth output images 208 or an embedding similar to the ground truth output images 208. The generated embedding 334 may be transmitted to the weight adjustment system 336. The architecture of the diffusion model 332 is described below in further detail (e.g., with respect to FIG. 4).

The weight adjustment system 336 may additionally receive the ground truth output images 208. The weight adjustment system 336 may compare the generated embedding 334 with the ground truth output images 208 to determine how similar the generated embedding 334 is to the ground truth output images 208. The comparison may be performed using a loss function. The loss function may be a mean squared errors (MSE) loss function. Based on the result of the loss function, one or more weight adjustment signals 338 may be generated by the weight adjustment system 336. The weight adjustment system 336 may transmit the weight adjustment signal(s) 338 to the diffusion model 332. The weight adjustment signals 338 may cause one or more weights of the diffusion model 332 to be adjusted/updated. For example, the weight adjustment signal(s) 338 may cause one or more weights of one or more layers/blocks (e.g., a convolutional block, a spatial attention block, a view attention block, and/or a frame attention block).

The training system may use additional training samples (e.g., over multiple training epochs) to cause the diffusion model 332 to generate additional generated embeddings that can be compared with the additional training samples to generate additional weight adjustment signal(s) 338 and update the diffusion model 332. Training the diffusion model 332 using the training system 300 may include an iterative training process. During the training of the diffusion model 332 using the training system, from the beginning of training to the end of training, the noise 316 added to the third embedding 314 may progressively become more noisy.

Figure 4:
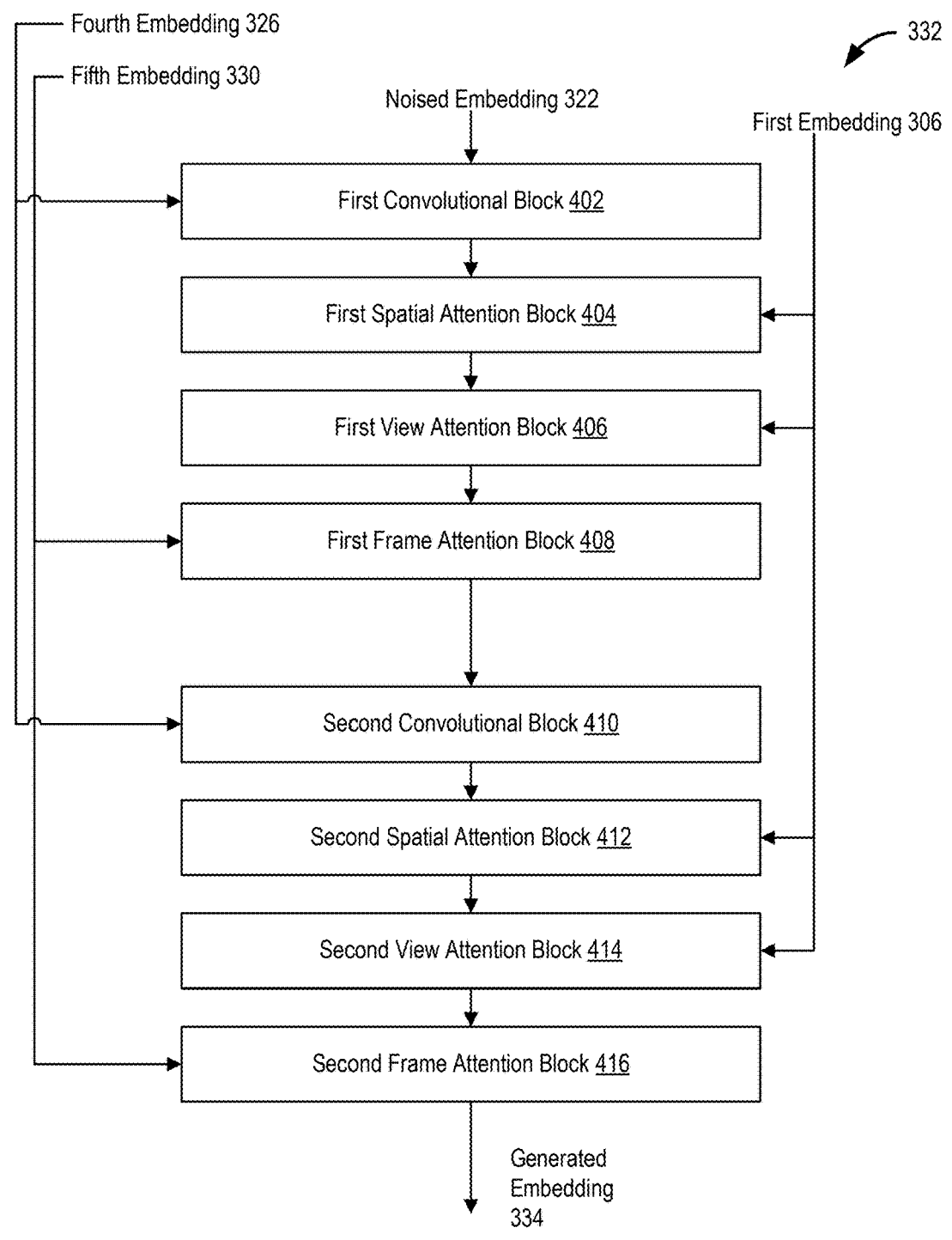
FIG. 4 is a block diagram illustrating an example architecture of a diffusion model, according to certain embodiments.

FIG. 4 is a block diagram illustrating an example architecture of a diffusion model 332 (e.g., diffusion model 332 described above), according to certain embodiments. The diffusion model 332 may include multiple blocks/layers. The diffusion model 332 may include a deep neural network (e.g., a U-Net) that learns to gradually denoise data (e.g., images representations) from random noise back into structured data. The blocks/layers in such models can serve a role in this iterative denoising process. The diffusion model 332 may include convolutional blocks, attention blocks (e.g., self attention, cross attention), time embedding blocks, noise embedding blocks, etc.

The diffusion model 332 may include zero or more convolutional blocks, zero or more spatial attention blocks, zero or more view attention blocks, zero or more frame attention blocks. In certain embodiments the blocks appear in a specific order throughout the diffusion model 332 (e.g., first convolutional block 402, first spatial attention block 404, . . . , second convolutional block 410, second spatial attention block 412, etc. In certain embodiments, the number of each block of a block type (e.g., convolutional block) are equal to a number of blocks of one or more other block types (e.g., spatial attention blocks). In certain embodiments, 10 or 11 total blocks are included in the diffusion model 332. In certain embodiments, 10 or 11 of each type of block are included in the diffusion model 332. For simplicity of illustration, the depicted architecture of the diffusion model 332 includes a first convolutional block 402, a first spatial attention block 404, a first view attention block 406, a first frame attention block 408, a second convolutional block 410, a second spatial attention block 412, a second view attention block 414, and a second frame attention block 416. More of less blocks may be included in the diffusion model 332. More or less of each block type may be included in the diffusion model 332.

The first convolutional block 402 may receive a noised embedding 322 (e.g., noised embedding 322 described above) and a fourth embedding 326 (e.g., fourth embedding 326). As described above, the fourth embedding 326 may include an embedding of a training camera view set 302 (e.g., training camera view set 302. Convolutional blocks can takes in noisy latents of flattened image matrix (e.g., the noised embedding 322) and handle the incorporation of conditioning camera poses represented by the fourth embedding 326. Convolutional blocks may apply a filter to an input to create a feature map that summarizes the presence of detected features in the input. The first convolutional block 402 may apply the filter to the noised embedding 322 to generate a feature map that summarizes the presence of detected features in the noised embedding 322. The feature map may be transmitted to one or more other blocks. The feature map may be transmitted to a first spatial attention block 404.

The first spatial attention block 404 may receive the feature map from the first convolution block 402 and a first embedding 306 (e.g., the first embedding 306 described above). Spatial attention blocks (e.g., the first spatial attention block 404) may focus on specific regions of input data (e.g., the feature map received from the first convolutional block 402) that are relevant to the text description. The spatial attention block can combine the attention over the entire text description. The spatial attention layer can handle image-level details by performing attention across the image width and image height axes. The first spatial attention block 404 can generate and output a first spatial attention output. The first spatial attention output can be transmitted to the first view attention block 406.

The first view attention block 406 may receive the first spatial attention output. The first view attention block 406 may receive the first embedding 306 in addition to the first spatial attention output. A view attention block (e.g., the first view attention block 406) may transpose feature and perform attention in multi-view axes. The attention block can provide multi-view consistency (e.g., consistency in object position and orientation across different camera views. By using the first embedding 306 (e.g., a CLIP embedding) of corresponding input image frames as cross attention conditioning, the network ay learn spatial consistency across novel views while maintaining semantic context from a training input video 204 (e.g., training input video 204) used to generate the first embedding 306.

The first frame attention block 408 can provide dynamic consistency across image frames, which can apply the attention mechanism in the image frame dimension. The frame attention of each novel view image frame is conditioned on the corresponding reference view via cross-attention, allowing the network to preserve dynamic coherence starting from the first image frame. The frame attention block may output a frame attention output For example, when generating a fourth timestep image of a fourth image set (e.g., fourth timestep image of a fourth image set 216d described above), a first timestep image of the fourth image set (e.g., first timestep image of the fourth image set 216a may be used to generate an embedding for conditioning the frame attention block. As another example, when generating a third timestep image of a third image set (e.g., third timestep image of a third image set 214c described above), a first timestep image of the third image set (e.g., first timestep image of the third image set 214a may be used to generate an embedding for conditioning the frame attention block. Weights of the frame attention block(s) may be initialized based on (e.g., to match) the weights of the frame attention blocks from a first image-to-video video generation model such as Stable Video Diffusion (SVD).

The convolutional blocks, the spatial attention blocks, and view attention blocks may include weights that are initialized based on (e.g., to match) weights of frame attention a network from a second image-to-video diffusion model 332 such as Stable Video 3D (SV3D). Initializing the weights based on the second image-to-video diffusion model 332 may leverage the generalizability as well as rich dynamic and multi-view priors previously learned from large-scale video and 3D datasets.

The frame attention output generated by a frame attention block may be output from the diffusion model 332 or transmitted to another block included in the diffusion model 332. For example, the output from the first frame attention block 408 may be transmitted to the second convolutional block 410. The second convolutional block may process inputs like describes with respect to the first convolutional block 402. The second convolutional block 410 may generate an output and transmit the output to the second spatial attention block 412. The second spatial attention block 412 may process the input to the second spatial attention block 412 like described above with respect to the first spatial attention block 404. The second spatial attention block 412 may generate an output that can be transmitted to the second view attention block 414. The second view attention block 414 may process inputs like describes with respect to the first view attention block 406. The second view attention block 414 may generate output and transmit the output to the second frame attention block 414. The second frame attention block 414 may process the input like described with respect to the first frame attention block 408. The second frame attention block 416 may transmit output generated by the second frame attention block 416 to a convolutional block (e., a third convolutional block) or to another system that is not included in the diffusion model 332. Output transmitted to another system that is not included in the diffusion model 332 may be included in a generated embedding 334 (e.g., the generated embedding 334 described above) output by the diffusion model 332.

The images included in the training sample may be generated using a training set that includes dynamic 3D objects. The training set may be configured to include at least a threshold amount of image frames and/or object motion (e.g., object too fast, too far too slow, too close, no in frame, etc.).

Certain embodiments use several steps to curate and clean 4D objects for training purposes. Objects in a training set may be filtered out based included too few animated frames. To filter out objects with minimal motion, keyframes can be subsampled from each video in a dataset and a simple thresholding on the maximum L1 distance between these frames can be applied as a motion measurement. To render the training novel view videos, a camera distance from the object can be defined. Starting from a base value, the camera distance can be increased until the object fits within all frames of the rendered images.

Dynamic adjustments to the temporal sampling step can also be performed. Starting from a base value, a temporal sample step can be increased until an L1 distance between consecutive keyframes exceeds a certain threshold. Such data set filtering steps can ensure a high-quality collection of 4D objects.

In certain embodiments, reconstruction losses used may include a pixel-level MSE loss, mask loss, and a perceptual LPIPS loss. In certain embodiments, geometric priors can be used to regularize output shapes, such as a mono normal loss and/or as well as bilateral depth and normal smoothness losses to encourage smooth 3D surfaces where projected image gradients are low.

For training efficiency and stability, a coarse-to-fine, static-to-dynamic strategy can be used to optimize a 4D representation. A deformation field MLP can be frozen and a canonical NeRF on the multi-view images of the first frame can be optimized while gradually increasing a rendering resolution from 128×128 to 512×512. Then, the unfreeze MLP can be unfrozen and 4 frames×4 views may be sampled for training. Following the static-to-dynamic strategy, the time embedding t from low to high temporal frequency can be optimized. In certain embodiments, sampling more timestamps in one batch and progressive optimization techniques improve 4D output quality. In certain embodiments, the dynamic NeRF is rendered at 512×512 resolution and use an optimizer to train all model parameters is used. In certain embodiments, the overall optimization takes about 15-20 minutes per object.

The diffusion model 332 may simultaneously generate a V×F grid of images, which can quickly become large with long input videos; making it infeasible to fit into memory even on modern GPUs. As a remedy, certain embodiments include techniques to sequentially process an interleaved subset of input frames while also retaining consistency in the output image grid. After generating the multiple novel view videos, a 4D representation of the dynamic 3D asset can be optimized.

B. Inference System Architecture

A diffusion model may be included in an inference system. The diffusion model may be the diffusion model 312 trained using the training system 300 as described above. The diffusion model may generate one or more images (e.g., image frames). The images may be included in one or more videos (e.g., a set of videos).

Figure 5:
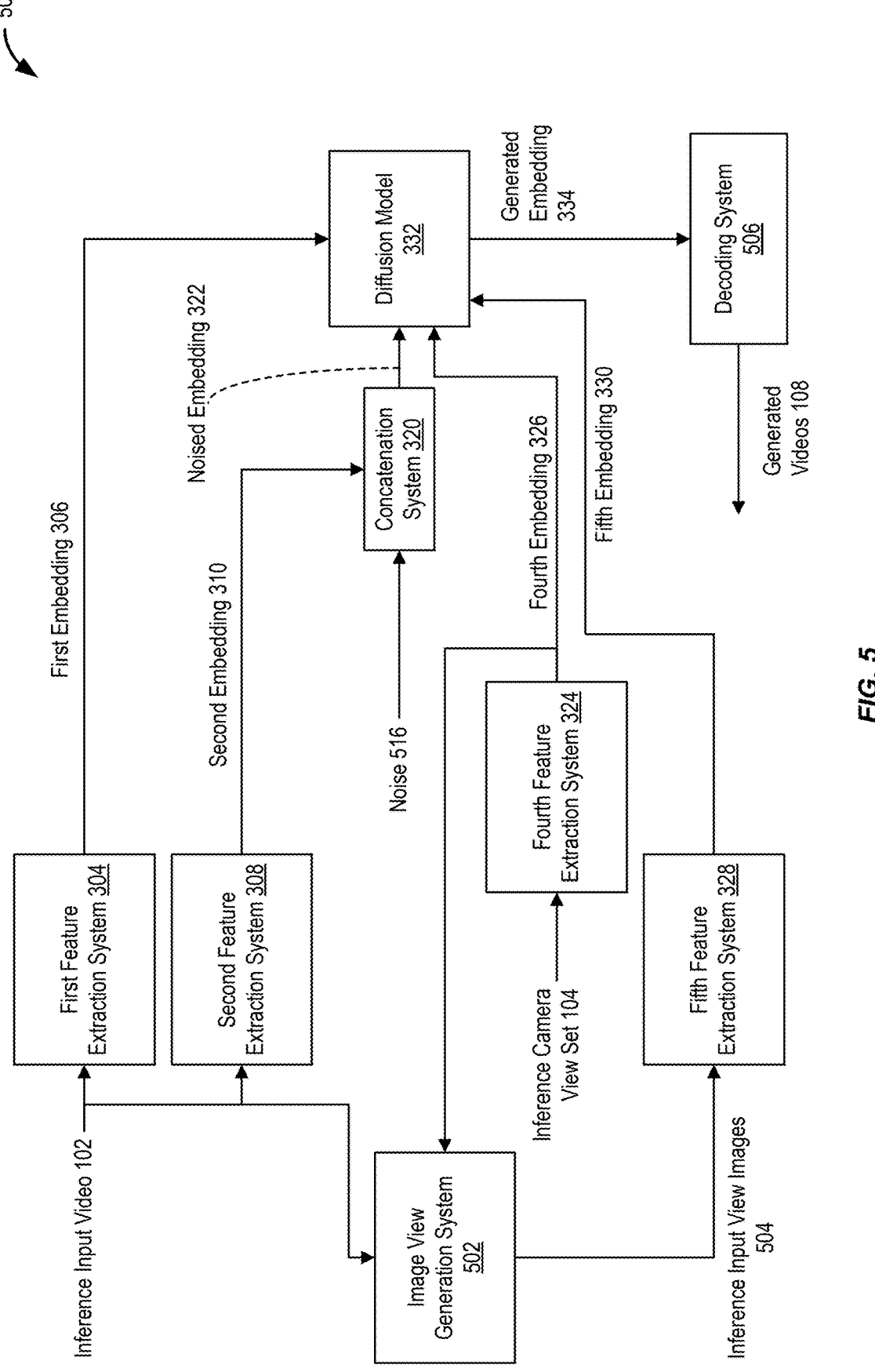
FIG. 5 is a block diagram illustrating an example inference system, according to certain embodiments.

FIG. 5 is a block diagram illustrating an example inference system 500, according to certain embodiments. The inference system can include a first feature extraction system 304 (e.g., the first feature extraction system 304 described above), a second feature extraction system 308 (e.g., the second feature extraction system 308 described above), an image view generation system 502, a fourth feature extraction system 324 (e.g., the fourth feature extraction system 324 described above), a fifth feature extraction system 328 (e.g., the fifth feature extraction system 328 described above), a concatenation system 320 (e.g., the concatenation system 320 described above), a diffusion model 332 (e.g., the diffusion model 332 trained as described with respect to FIG. 3 above), and/or a decoding system 506.

The inference system may receive an inference input video 102 (e.g., inference input video 102 described above) as input. The inference input video 102 may be received from a user device, a user interface, system separate from the inference system, and/or video storage, etc. The inference input video 102 may include two or more image frames that are shown from a first camera view. The image frames of the inference input video 102 may represent an object depicted at one or more positions and/or orientations with respect to the first camera view. The image frames may correspond to timesteps. For example, a first image frame included in the inference input video 102 may include an image frame at a first timestep of the inference input video 102 and a second image frame included in the inference input video 102 may include an image frame at a second timestep of the inference input video 102.

In certain embodiments, the inference input video 102 is generated by an image-to-video generation system 106 (e.g., an image-to-video generation model). The inference input video 102 may be generated after receiving a first image frame.

The inference input video 102 may be input to the first feature extraction system 304 to generate a first embedding 306 (e.g., like the first embedding 306 described above). The inference input video 102 may be input to the second feature extraction system 308 to generate a second embedding 310 (e.g., like the second embedding 310 described above).

The second embedding 310 may be input to the concatenation system 320. The concatenation system 320 may concatenate the second embedding 310 with noise 516 to generate a noised embedding 322. Noise 516 may be noise that is randomly sampled from a distribution and to generate a generated embedding 334 that is output from the diffusion model 332. The noise 516 may include a randomized signal having statistical properties, for example, Gaussian-distributed values. The introduction of noise 516 can provide a starting condition from which the model progressively constructs an output by removing the noise 516 in successive denoising steps. In certain embodiments, the second embedding 310 is not concatenated with the noise 516 and the noised embedding 322 includes the noise.

An embedding of an image frame (e.g., the image frame at the first timestep) of the inference input video 102 may be used to generate a set of input view images. The image frame may be used to generate the set of inference input view images by inputting the frame into an image view generation system 502. The input view images may also be referred to as reference view images herein since they can be used by the diffusion model 332 to generate other images from the same camera view. The image view generation system 502 may include a model (e.g., SV3D) that has been trained to generate a set of images from different camera views based on an input image. For example, the image generation system may generate a first timestep image from a second camera view that is different than the camera view that the image frame at the first timestep of the inference input video 102 is represented from. Further to the example, image generation system may generate a first timestep image from a third camera view that is different than the first camera view and the second camera view. A number of images generated by the image generation system may be determined by how many camera views the image generation system is configured to use to generate images. The camera views to generate images from may be predefined (e.g., set by model parameters). The camera views to generate images from may be set based on input to the image generation system. The input may include a representation of an inference camera view set 104. For example, the representation of the inference camera view set 104 may include a fourth embedding 326 generated by the fourth feature extraction system 324 based on the inference camera view set 104 (e.g., inference camera view set 104 as described above). In certain embodiments, the image view generation system 502 can generate and use the representation of the inference camera view set 104 by using an internal feature extraction system like the fourth feature extraction system 324. The inference camera view set 104 may be received from a user device, a server, camera view set storage, and/or a user interface. In certain embodiments, the inference input view images are received by the fifth feature extraction system 328 after being generated by a user device (e.g., a camera).

The inference input view images generated by the image generation system can have similar characteristics as training input view images 206 (e.g., training input view images 206 206 described above). The inference input view images may be transmitted to the fifth feature extraction system 328 and used by the fifth feature extraction system 328 to generate a fifth embedding 330. The fifth feature extraction system 328 and the fifth embedding 330 may be similar to the fifth feature extraction system 328 and the fifth embedding 330 described above. In certain embodiments, the inference input view images are represented in vector space and do not need to be input to the fifth feature extraction system 328 before being input to the diffusion model 332 because the inference input view images are already represented in vector space (e.g., by an embedding).

The diffusion model 332 may receive the first embedding 306, the noised embedding 322, the fourth embedding 326, and/or the fifth embedding 330. The diffusion model 332 may process the inputs as described above (e.g., with respect to FIGS. 1, 3, and 4).

The inference input view images represented by the first embedding 306 may be used as reference images for generating novel image frames (e.g., image frames not included in the inference input video 102) from novel camera views (camera view(s) not included in the inference input video 102) at one or more timesteps that correspond to the timesteps of the inference input video 102. The images from camera views represented by the fifth embedding 330 may be used as reference camera views for generating the novel image frames from the novel camera views.

As an example, the first embedding 306 can represent (e.g., include embeddings of) timestep images of a first image set like the training input video 204 described above. Further, the fifth embedding 330 can represent (e.g., include embeddings of) timestep images of one or more image sets) like the training input view images 206 described above. For simplicity of explanation, how the diffusion model 332 can operate at inference time is described with respect to the training input video 204 and the training input view images 206 described above with respect to FIG. 2. To explain how images are generated by the diffusion model 332.

For the example, if the training input video 204 were provided as input to the inference system, the image view generation system can be caused to generate the first timestep image of the second image set, the first timestep image of the third image set, and the first timestep image of the fourth image set. The training input view could be represented by the fifth embedding 330. The diffusion model 332 may generate the second timestep image of the second image set based on the second timestep image represented by the first embedding 306 and the first timestep image of the second image set. The diffusion model 332 may additionally generate the second timestep image based on the noised embedding 322, and the fourth embedding 326.

Continuing the example, the diffusion model 332 may generate the third timestep image of the second image set based on the third timestep image represented by the first embedding 306 and the first timestep image of the second image set. The diffusion model 332 may additionally generate the third timestep image of the second image set based on the noised embedding 322, and the fourth embedding 326. Further, continuing the example, the diffusion model 332 may generate the fourth timestep image of the second image set based on the fourth timestep image represented by the first embedding 306 and the first timestep image of the second image set. The diffusion model 332 may additionally generate the third timestep image of the second image set based on the noised embedding 322, and the fourth embedding 326.

Continuing the example, the diffusion model 332 may generate the second timestep image of the third image set based on the second timestep image represented by the first embedding 306 and the first timestep image of the third image set. The diffusion model 332 may additionally generate the second timestep image of the third image set based on the noised embedding 322, and the fourth embedding 326. Further continuing the example, the diffusion model 332 may generate the third timestep image of the third image set based on the third timestep image represented by the first embedding 306 and the first timestep image of the third image set. The diffusion model 332 may additionally generate the third timestep image of the third image set based on the noised embedding 322, and the fourth embedding 326. Further continuing the example, the diffusion model 332 may generate the fourth timestep image of the third image set based on the fourth timestep image represented by the first embedding 306 and the first timestep image of the third image set. The diffusion model 332 may additionally generate the fourth timestep image based on the noised embedding 322, and the fourth embedding 326.

Continuing the example, the diffusion model 332 may generate the second timestep image of the fourth image set based on the second timestep image represented by the first embedding 306 and the first timestep image of the fourth image set. The diffusion model 332 may additionally generate the second timestep image of the second fourth image set based on the noised embedding 322, and the fourth embedding 326. Further continuing the example, the diffusion model 332 may generate the third timestep image of the fourth image set based on the third timestep image represented by the first embedding 306 and the first timestep image of the fourth image set. The diffusion model 332 may additionally generate the third timestep image of the fourth image set based on the noised embedding 322, and the fourth embedding 326. Further continuing the example, the diffusion model 332 may generate the fourth timestep image of the fourth image set based on the fourth timestep image represented by the first embedding 306 and the first timestep image of the fourth image set. The diffusion model 332 may additionally generate the fourth timestep image based on the noised embedding 322, and the fourth embedding 326.

Although inference of the diffusion model 332 has been described with respect to the training sample data for simplicity of explanation, one of ordinary skill in the art with the benefit of the present disclosure would recognize images from a first camera view and images from one or more other camera views can be used to cause the diffusion model 332 to generate the generated embedding 334.

The timestep images and timestep image sets generated by the diffusion model 332 may be represented in an embedding space included in a generated embedding 334 when output from the diffusion model 332 and may be decoded by the decoder. The decoder may be a VAE decoder. The VAE decoder may have been trained with a VAE encoder used to encode the inference input video 102 image frames. The decoder may output generated videos 108 from the novel camera views.

In certain embodiments, a sparse set of anchor frames with SV4D (interleaved sampling) is generated. Then anchor frames can be used as new reference views to densely sample remaining frames (dense sampling). To ensure a smooth transition between consecutive generations, embodiments may alternatively use the first (forward) or last (backward) anchor frame for conditioning at each diffusion step. In certain embodiments, during inference sampling, the image view generation system can use a linearly increasing scale for classifier-free guidance (CFG) over time (video frame axis) to avoid losing context from the first reference frame. In certain embodiments, the diffusion model 332 uses a triangular CFG scaling when generating an orbital video around a static 3D object to avoid over-sharpened or over-saturated outputs.

Certain embodiments use a spatio-temporal CFG scaling which integrates a linearly-increasing scale in the frame axis and a triangular wave in the view axis (linearly increase when moving away from the input view, and linearly decrease when rotating back towards the input view).

II. Method

The processing performed using the training system architecture described above with respect to FIGS. 3-4 may be implemented using a method of training. The processing performed using the inference system architecture described above with respect to FIG. 5 may be implemented using an inference time method. Examples of such methods are described below with respect to methods 600 and 700.

The processing depicted in methods 600 and 700 and any other FIGS. may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in methods 600 and 700, and other FIGS. and described herein are intended to be illustrative and non-limiting. Although methods 600 and 700, and other FIGS., depict the various processing steps occurring in a particular sequence or order, this is not intended to be limiting. In certain alternative embodiments, the processing may be performed in some different order or some steps may also be performed in parallel. It should be appreciated that in alternative embodiments the processing depicted in methods 600 and 700, and other FIGS., may include a greater number or a lesser number of steps than those depicted in the respective FIGS.

C. Method of Training

FIG. 6 shows an example method 600 of training a diffusion model (e.g., diffusion model 332 described above), according to certain embodiments of the present disclosure. The method may be performed by the training system 300 described above.

At S602, the diffusion model may receive a first embedding. The first embedding may have been generated by a first feature extractor (e.g., first feature extractor 304 described above). The first feature extractor may include a CLIP model and generate the first embedding based on an input video (e.g., input video 204 described above).

At S604, the diffusion model may receive a noised embedding (e.g., noised embedding 322 described above). The noised embedding may have been generated by a concatenation system (e.g., concatenation system 320 described above). The concatenation system may have concatenated a second embedding 310 (e.g., second embedding 310 described above) and an embedding generated by a noise generation system 318 (e.g., noise generation system 318 described above).

At step S606, the diffusion model may receive a fourth embedding (e.g., fourth embedding 326 described above). The fourth embedding may have been generated by a fourth feature extractor system (e.g., a VAE encoder, the fourth feature extractor described above). The fourth embedding may represent a training camera view set.

At S608, the diffusion model may receive a fifth embedding 330 (e.g., fifth embedding 330 describe above). The fifth embedding 330 may be generated by a fifth feature extraction system 328 (e.g., fifth feature extraction system 328 described above). The fifth embedding 330 may represent training input view images (e.g., training input view images 206 described above).

At S610, the diffusion model may generate and output a generated embedding (e.g., generated embedding 334). The diffusion model may operate as described above with respect to diffusion model 332.

At S612, the diffusion model may transmit the generated embedding to a weight adjustment system (e.g., weight adjustment system described above). The weight adjustment system may compare the generated embedding with ground truth output images 208 (e.g., ground truth output images 208 described above). Based on the comparison (e.g., using a loss function), the weight adjustment system may generate one or more weight adjustment signals (e.g., weight adjustment signals 338.

At S614, the diffusion model may receive the one or more weight adjustment signals and adjust one or more weights of the diffusion model. Steps S602-614 may be performed for multiple (e.g., many iterations) during training of the diffusion model. Training may stop after a set period of time, after a set accuracy has been reached, and/or after all training samples have been used.

D. Method of Inference

FIG. 7 shows an example method 700 for using an inference system, according to certain embodiments of the present disclosure. The method may be performed by the inference system 500 described above.

At S702, a first image frame may be received by the inference system. The first image frame may be included in a first video. The first video may be received by the inference system. An example of a first image frame may include the first timestep image of the first image set 210 described above. The first image frame may show an object from a first camera view. The first camera view may include a virtual camera view or a physical camera view. The first camera view may be defined by a position and/or orientation. The position and orientation may be defined relative to a coordinate system and/or relative to the object.

A second image frame may additionally be received by the inference system. The second image frame may be another image frame included in the first video (e.g., second timestep image of the first image set 210b described above with respect to the inference system). The first image frame may be a different image frame than the second image frame. The second image frame may show the object from the first camera view.

The first image frame and the second image frame may be received by the first feature extractor 304 and/or second feature extractor 308 described above. Embeddings of the first image frame and the second image frame may be received by the concatenation system 320 and/or the diffusion model 332 described above.

At S704, a third image frame of the object may be generated from a second view that is different than the first view. The third image frame may be generated based on the first image frame. An example of the third image frame may include the first timestep image of the second image set 212a described above with respect to the inference system.

In certain embodiments, the third image frame is included in a set of image frames. The set of image frames can be generated based on the first image frame. The set of image frames may be generated by the image view generation system 502 described above. Each image included in the set of image frames may include an image of the object from a different view. The set of image frames may be included in the inference input view images 50 described above. The views and number of images represented by the set of image frames may be determined by a parameter of the image view generation system and/or by a received indication. The indication may be received from a user interface, a user device, a client device, and/or a server, etc.

At S706, a fourth image frame can be generated. The fourth image frame can be generated by a diffusion model (e.g., diffusion model 332 described above). The diffusion model may generate the fourth image based on the second image frame and the third image frame (e.g., based on a first embedding 306, a noised embedding 322, and/or a fifth embedding 330 described above which can be generated based on the first image frame and/or the second image frame).

The diffusion model may include one or more view attention blocks (e.g., first view attention block 406 described above). As described above, the view attention block may receive conditioning that includes an embedding of the first image frame and the second image frame, the embedding (e.g., first embedding 306) can be generated by a contrastive language-to-image pretraining model.

The diffusion model may include one or more frame attention blocks (e.g., first frame attention block 408). As described above, the frame attention block may receive conditioning that includes an embedding (e.g., fifth embedding 330) of at least one of the first image frame or the second image frame.

The diffusion model may receive a noised embedding (e.g., noised embedding 322 described above). The noised embedding may be generated by concatenating generated noise (e.g., noise 516) with an embedding of the first video. The fourth image frame may be generated based on the noised embedding, the first embedding, a fourth embedding (e.g., fourth embedding 326) and/or the fifth embedding. As described herein, the training the diffusion model may include using a training dataset with representations of videos of objects that have a motion between image frames that is above a predefined motion threshold. The fourth image frame may show the object from the second view.

At S708, a second video is generated. The second video may include a video of the object. The second video may be generated by combining the third image frame and the fourth image frame.

In certain embodiments, after the video of the object from the second view is generated, the video is caused to be presented by a user interface (e.g., of a user device, of a client device, etc.). The video may be presented by a device that generated the video and/or by another device. The video may be presented at the same time as the first image frame and the second image frame.

III. Computer System

Figure 8:
FIG. 8 depicts a block diagram of an exemplary computer apparatus, according to certain embodiments.

Any of the computer systems mentioned herein may utilize any suitable number of subsystems. Examples of such subsystems are shown in FIG. 8 in computer system 800. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 8 are interconnected via a system bus 830. Additional subsystems such as a printer 808, keyboard 818, storage device(s) 820, monitor 814 (e.g., a display screen, such as an LED), which is coupled to display adapter 812, and others are shown. Peripherals and input/output (I/O) devices, which couple to I/O controller 802, can be connected to the computer system by any number of means known in the art such as input/output (I/O) port 816 (e.g., USB, FireWire®). For example, I/O port 816 or external interface 822 (e.g., Ethernet, Wi-Fi, etc.) can be used to connect computer system 800 to a wide area network such as the Internet, a mouse input device, or a scanner. The interconnection via system bus 830 allows the central processor 806 to communicate with each subsystem and to control the execution of a plurality of instructions from system memory 804 or the storage device(s) 820 (e.g., a fixed disk, such as a hard drive, or optical disk), as well as the exchange of information between subsystems. The system memory 804 and/or the storage device(s) 820 may embody a computer readable medium. Another subsystem is a data collection device 810, such as a camera, microphone, accelerometer, and the like. Any of the data mentioned herein can be output from one component to another component and can be output to the user.

A computer system can include a plurality of the same components or subsystems, e.g., connected together by external interface 822, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components. In various embodiments, methods may involve various numbers of clients and/or servers, including at least 10, 20, 50, 100, 200, 500, 1,000, or 10,000 devices. Methods can include various numbers of communication messages between devices, including at least 100, 200, 500, 1,000, 10,000, 50,000, 100,000, 500,00, or one million communication messages. Such communications can involve at least 1 MB, 10 MB, 100 MB, 1 GB, 10 GB, or 100 GB of data.

Aspects of embodiments can be implemented in the form of control logic using hardware circuitry (e.g., an application specific integrated circuit or field programmable gate array) and/or using computer software stored in a memory with a generally programmable processor in a modular or integrated manner, and thus a processor can include memory storing software instructions that configure hardware circuitry, as well as an FPGA with configuration instructions or an ASIC. As used herein, a processor can include a single-core processor, multi-core processor on a same integrated chip, or multiple processing units on a single circuit board or networked, as well as dedicated hardware. The computations can be performed in parallel by the different processing units and/or different processing threads of a single processing unit. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such devices. In addition, the order of operations may be re-arranged. A process can be terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Any operations performed with a processor may be performed in real-time. The term "real-time" may refer to computing operations or processes that are completed within a certain time constraint. As examples, a time constraint may be 30 seconds, 1 minute, 10 minutes, 30 minutes, 1 hour, 4 hours, 1 day, or 7 days. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted as prior art. Where a conflict exists between the instant application and a reference provided herein, the instant application shall dominate.

What is claimed is:

1. A system comprising: one or more storage media storing instructions; and one or more processors configured to execute the instructions to cause the system to perform operations comprising: receiving a first image frame corresponding to a first time showing an object from a first view and a second image frame corresponding to a second time showing the object from the first view, wherein the first image frame and second image frame are different image frames, and wherein the first time and the second time are different; generating, based at least in part on the first image frame, a third image frame of the object from a second view that is different than the first view and corresponding to the first time; generating, based at least in part on the second image frame and the third image frame, a fourth image frame of the object from the second view; and generating a video of the object from the second view by combining at least the third image frame and fourth image frame.

2. The system of claim 1, wherein the third image frame is included in a set of image frames generated based at least in part on the first image frame and each image frame in the set of image frames includes an image of the object from a different view.

3. The system of claim 1, wherein the fourth image frame corresponds to the second time.

4. The system of claim 1, wherein the processors are configured to execute the instructions to cause the system to perform operations further comprising: generating the third image frame by generating a set of images from multiple views based at least in part on the first image frame and a set of indicated views.

5. The system of claim 1, wherein the processors are configured to execute the instructions to cause the system to perform operations further comprising: generating the fourth image frame using a diffusion model.

6. The system of claim 5, wherein the diffusion model includes a view attention block.

7. The system of claim 5, wherein the diffusion model includes a frame attention block.

8. The system of claim 5, wherein the processors are configured to execute the instructions to cause the system to perform operations further comprising: concatenating generated noise with an embedding of a second video of the object to generate a noised embedding, wherein the second video includes the first image frame and the second image frame; and generating, by the diffusion model and based at least in part on the noised embedding, the fourth image frame.

9. The system of claim 5, wherein the diffusion model includes a view attention block that receives conditioning that includes an embedding of the first image frame and the second image frame, wherein the embedding is generated by a contrastive language-to-image pretraining model.

10. The system of claim 5, wherein the diffusion model includes a frame attention block that receives conditioning that includes an embedding of at least one of the first image frame and the third image frame.

11. The system of claim 5, wherein training the diffusion model includes using a training dataset with representations of videos of objects that have a motion between image frames that is above a predefined motion threshold.

12. A method comprising: receiving a first image frame corresponding to a first time showing an object from a first view and a second image frame corresponding to a second time showing the object from the first view, wherein the first image frame and second image frame are different image frames, and wherein the first time and the second time are different; generating, based at least in part on the first image frame, a third image frame of the object from a second view that is different than the first view and corresponding to the first time; generating, based at least in part on the second image frame and the third image frame, a fourth image frame of the object from the second view; and generating a video of the object from the second view by combining at least the third image frame and fourth image frame.

13. The method of claim 12, wherein the third image frame is included in a set of image frames generated based at least in part on the first image frame and each image frame in the set of image frames includes an image of the object from a different view.

14. The method of claim 12, further comprising: causing the first image frame, the second image frame, and the video to be presented by a user interface.

15. The method of claim 12, further comprising: generating the third image frame by generating a set of images from multiple views based at least in part on the first image frame and a set of indicated views.

16. The method of claim 12, wherein generating the second image frame is performed using a model with a configuration and wherein generating the third image frame is performed using the model with the configuration.

17. One or more non-transitory computer-readable storage media storing instructions that, upon execution by one or more processors of a system, cause the system to perform operations comprising: receiving a first image frame corresponding to a first time showing an object from a first view and a second image frame corresponding to a second time showing the object from the first view, wherein the first image frame and second image frame are different image frames, and wherein the first time and the second time are different; generating, based at least in part on the first image frame, a third image frame of the object from a second view that is different than the first view and corresponding to the first time; generating, based at least in part on the second image frame and the third image frame, a fourth image frame of the object from the second view; and generating a video of the object from the second view by combining at least the third image frame and fourth image frame.

18. The computer-readable storage media of claim 17, wherein the third image frame is included in a set of image frames generated based at least in part on the first image frame and each image frame in the set of image frames includes an image of the object from a different view.

19. The computer-readable storage media of claim 17, wherein the processors are configured to execute the instructions to cause the system to perform operations further comprising: causing the first image frame, the second image frame, and the video to be presented by a user interface.

20. The computer-readable storage media of claim 17, wherein the processors are configured to execute the instructions to cause the system to perform operations further comprising: generating the third image frame by generating a set of images from multiple views based at least in part on the first image frame and a set of indicated views.

* * * * *